United States Patent Office 3,846,146
Patented Nov. 5, 1974

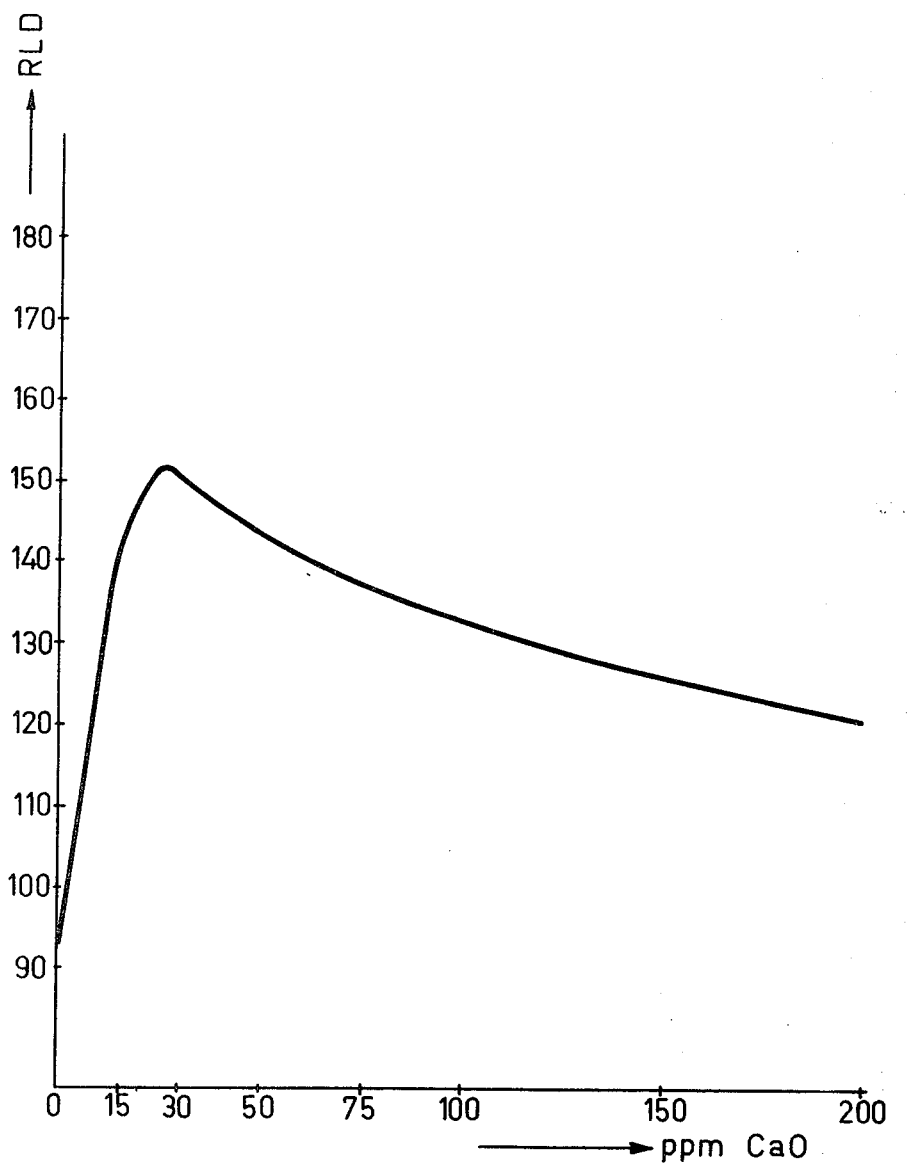

3,846,146
TRANSPARENT ARTICLES OF ALUMINUM OXIDE AND METHOD OF MANUFACTURING SAID ARTICLES
Bernardus Jacobus Hunting and Gerardus Alfonsus Jeunink, Emmasingel, Eindhoven, Netherlands, assignors to U.S. Philips Corporation, New York, N.Y.
Filed Mar. 23, 1973, Ser. No. 344,266
Claims priority, application Netherlands, Apr. 7, 1972, 7204638
Int. Cl. C04b 35/10
U.S. Cl. 106—62           6 Claims

ABSTRACT OF THE DISCLOSURE

An article having an improved permeability of light essentially consisting of transparent densely sintered polycrystalline aluminum oxide manufactured in a known manner from a finely divided powder of aluminum oxide which comprises 0.01–0.5% by weight of magnesium oxide and 0.001–0.02% by weight of calcium oxide.

---

The invention relates to transparent articles of densely sintered polycrystalline aluminum oxide and to a method of manufacturing such articles.

Transparent articles of densely sintered polycrystalline aluminum oxide may be obtained by sintering a compressed powder of finely divided aluminum oxide. To achieve a satisfactory permeability to light it is important that the article ultimately obtained has few or no pores. This may be improved by adding a slight quantity of one or more other metal oxides to the aluminum oxide which is used as the starting material.

It is known from United Kingdom patent specification 931,023 to add magnesium oxide for this purpose. An optimum light permeability is obtained when adding 0.1 part by weight of magnesium oxide to 100 parts by weight of aluminum oxide.

Furthermore German Offenlegungsschrift 2,042,379 states that the light permeability and other properties of sintered articles of aluminum oxide can be improved by not only adding 0.01 to 0.1% by weight of magnesium oxide to the powder of aluminum oxide, which is used as a starting material, but also 0.05–0.5% by weight of yttrium oxide and 0.05–0.5% by weight of lanthanum oxide.

An object of the invention is to provide articles of densely sintered transparent polycrystalline aluminum oxide having an improved permeability to light.

The Applicant has found that such articles can be obtained by not only adding magnesium oxide but also calcium oxide to the aluminum oxide powder which is used as the starting material for the manufacture of the areticles. As compared with the quantities of metal oxides, which are added in accordance with the prior art method, the quantity of calcium oxide added according to the invention is surprisingly small.

According to the prior art method an optimum light permeability is obtained when using approximately 0.1% by weight of magnesium oxide; if used in combination with yttrium oxide and/or lanthanum oxide an optimum light permeability is achieved when using approximately 0.08% by weight of MgO+0.2% by weight of $Y_2O_3$ or 0.2% by weight of $La_2O_3$ and approximately 0.1% by weight of MgO+2% by weight of $Y_2O_3$+0.2% by weight of $La_2O_3$ (German Offenlegungsshrift 2,042,379).

The quantity of calcium oxide with which an optimum light permeability is obtained according to the invention is approximately 0.003% by weight calculated on the quantity of aluminum oxide.

The invention relates to a formed article consisting of magnesium oxide-containing and another metal oxide-containing transparent densely sintered polycrystalline aluminum oxide and is characterized in that the other metal oxide is calcium oxide and that the content of calcium oxide is 0.001 to 0.02% by weight.

It is assumed that during the sintering process magnesium oxide prevents the growth of crystallites (grain growth) of aluminum oxide and promotes the diffusion of pores to the crystal boundaries. During the last stage of the sintering process magnesium oxide evaporates to a considerable extent. Under circumstances this may give rise to a finished article having a very small quantity of magnesium oxide.

The invention also relates to a method of manufacturing a formed article essentially consisting of transparent densely sintered polycrystalline aluminum oxide in which a body obtained by compressing a mixture which in addition to 100 parts by weight of aluminum oxide and 0.01–0.5 parts by weight of magnesium oxide comprises another metal oxide for the manufacture of such an article in known manner is successively sintered in an oxygen-containing atmosphere between approximately 1000° C. and 1600° C. and thereafter in vacuo or in a hydrogen-containing atmosphere between approximately 1700° C. and 1950° C., and is characterized in that the compressed mixture comprises 0.001–0.02 parts by weight of calcium oxide as the other metal oxide.

A known method of manufacturing an article of transparent densely sintered polycrystalline aluminum oxide is described, for example, in United States Patent Specification 3,026,210. According to this method a mixture is prepared from a finely divided powder of aluminum oxide and a small but effective quantity of up to 0.5% by weight of a finely divided powder of magnesium oxide. The mixture obtained is compressed to a body having a density which is at least 35% of the theoretical density of a single crystal of pure aluminum oxide. This body is prefired in an oxygen-containing atmosphere between approximately 1000° C. and 1200° C. for at least one hour whereafter the body thus prefired is heated in vacuo or in hydrogen between approximately 1700° C. and 1950° C. until an article having an optimum permeability to light is obtained.

A similar method is described in the previously mentioned German Offenlegungsschrift; in this method prefiring is effected at a temperature of between 1200° C. and 1600° C. and sintering in vacuo or in a reducing atmosphere is effected between 1600° C. and 1800° C.

A similar method is likewise described in United Kingdom patent specification 931,023. In this method prefiring is effected in an oxygen-containing atmosphere between 1000° C. and 1700° C. and preferably between 1000° C. and 1200° C.; the prefired body is subsequently sintered above 1700° C. and preferably between 1850° C. and 1950° C. to its maximum light permeability preferably in a hydrogen atmosphere.

In the method according to the invention prefiring of a body compressed of an intimate mixture of finely divided powders of aluminum oxide, magnesium oxide and calcium oxide may be effected in accordance with one of the known methods; densely sintering the prefired body at a comparatively high temperature may likewise be effected in accordance with one of the known methods.

Instead of calcium oxide, a calcium compound which is converted to calcium oxide during prefiring or post-sintering may be used, for example, calcium hydroxide or calcium carbonate.

It has been found that the light permeability which can be achieved is dependent on the quantity of calcium oxide used. In the Figure the relative light permeability (RLD) is shown (arbitrary scale) as a function of the added calcium oxide (CaO)—the Figures along the CaO axis denote the quantities of calcium oxide used in parts by weight per million parts by weight (p.p.m.) of aluminum oxide. As can be seen from the Figure an optimum light permeability is obtained when using approximately 30 (25–35) parts by weight of calcium oxide per million parts by weight of aluminum oxide corresponding to a content of approximately 0.003% by weight (0.0025–0.0035% by weight) of calcium oxide in the finished densely sintered article.

Furthermore the Figure shows that the use of approximately 15–75 parts by weight (corresponding to 0.0015–0.0075% by weight) of calcium oxide per million parts by weight of aluminum oxide has a very favourable influence on the light permeability of the densely sintered product.

Since the quantities of calcium oxide to be used in the method according to the invention are very small as compared with the quantity of aluminum oxide and for the case where calcium oxide (or a calcium compound which is converted into calcium oxide during prefiring or post-sintering) is used in the form of a finely divided powder, it is to be mixed very carefully with the finely divided powder of aluminum oxide so as to achieve a satisfactory distribution of calcium oxide and obtain homogeneous sintered products whose light permeability does not differ from area to area.

It has been found that very homogeneous products can be obtained if calcium oxide is used in the form of a solution of calcium oxide or of a calcium compound and if the still porous body obtained during presintering is soaked with this solution, for example, by immersion into the solution. In this manner it is achieved that calcium oxide in the body subjected to the post-sintering treatment is distributed quite evenly throughout the body. The quantity of calcium oxide to be used may be determined simply by adapting the concentration of calcium oxide or of the calcium compound.

EXAMPLE 725 cubic cm. of deionized water in which 5.3 magnesium acetate ($Mg(C_2H_3O_2)\cdot 4H_2O$) and 15 g. of methyl cellulose (binder) had been dissolved were added to 1 kg. of aluminum oxide powder (grain size approximately 0.3 $\mu$m.) in a mixing machine.

After careful mixing the mixture was dried and sieved with the aid of a nylon sieve having meshes of 0.2 mm. The powder was then isostatically pressed to form two tubes of equal dimensions and wall thickness, which tubes were heated for 2 hours in an oxidizing atmosphere at 1200° C.

One of the still porous tubes was immersed in a solution of 0.33 g. calcium acetate ($Ca(C_2H_3O_2)\cdot H_2O$) in 1 litre of deionized water. The tube which weighed 12 g. prior to immersion had gained 3.5 grammes in weight. After this tube had been dried it was sintered together with the non-immersed tube for 4 hours at approximately 1900° C. in a hydrogen atmosphere. Comparative measurements resulted in a light permeability "RLD" of 80–110 for the tube which had not been immersed and 140–170 for the immersed tube.

The densely sintered, transparent polycrystalline aluminum oxide according to the invention is eminently suitable as a material for the walls of discharge vessels of high-pressure sodium vapour lamps.

What is claimed is:

1. In a formed article consisting of magnesium oxide-containing and another metal oxide-containing transparent densely sintered polycrystalline aluminum oxide, the improvement comprising that the other metal oxide is calcium oxide and that the content of calcium oxide is 0.001–0.02% by weight.

2. A formed article as claimed in Claim 1, wherein the content of calcium oxide is 0.0015–0.0075% by weight.

3. A formed article as claimed in Claim 2, wherein the calcium oxide content is 0.0025–0.0035% by weight.

4. A method of manufacturing a formed article essentially consisting of a transparent densely sintered polycrystalline aluminum oxide, comprising the steps of compressing a mixture to provide a body which mixture in addition to 100 parts by weight of finely divided aluminum oxide and 0.01–0.5 parts by weight of finely divided magnesium oxide comprises another finely divided metal oxide or a metal compound from which metal oxide is produced upon heating during the manufacture of such an article, said metal oxide being calcium oxide which is used in a quantity of 0.001–0.02 parts by weight, sintering said compressed body in an oxygen-containing atmosphere between approximately 1000° C. and 1600° C. and subsequently sintering said first sintered body in vacuo or in a hydrogen-containing atmosphere between approximately 1700° C. and 1950° C. until an optimum permeability to light is obtained.

5. A method as claimed in Claim 4, wherein calcium oxide is used in a quantity of 0.0015–0.0075 parts by weight.

6. A method as claimed in Claim 4, wherein calcium oxide is used in a quantity of 0.0025–0.0035 parts by weight.

References Cited
UNITED STATES PATENTS

| | | | |
|---|---|---|---|
| 3,026,210 | 3/1962 | Coble | 106—73.4 |
| 3,311,482 | 3/1967 | Klingler et al. | 106—73.4 |
| 3,446,669 | 5/1969 | Arrance et al. | 106—65 |
| 3,363,134 | 1/1968 | Johnson | 106—65 |

JAMES E. POER, Primary Examiner

U.S. Cl. X.R.

106—65, 73.4